United States Patent
Hestermann et al.

(10) Patent No.: US 10,125,812 B2
(45) Date of Patent: Nov. 13, 2018

(54) ROTARY-TABLE BEARING ASSEMBLY

(71) Applicant: Schaeffler Technologies AG & Co. KG, Herzogenaurach (DE)

(72) Inventors: Jorg-Oliver Hestermann, Aurachtal (DE); Gunter Schmid, Nurnberg (DE); Jurgen Hilbinger, Neustadt/A (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 88 days.

(21) Appl. No.: 15/127,191

(22) PCT Filed: Mar. 13, 2015

(86) PCT No.: PCT/DE2015/200159
§ 371 (c)(1),
(2) Date: Sep. 19, 2016

(87) PCT Pub. No.: WO2015/139702
PCT Pub. Date: Sep. 24, 2015

(65) Prior Publication Data
US 2017/0108037 A1 Apr. 20, 2017

(30) Foreign Application Priority Data
Mar. 19, 2014 (DE) .................. 10 2014 205 097

(51) Int. Cl.
F16C 19/52 (2006.01)
F16C 27/04 (2006.01)
(Continued)

(52) U.S. Cl.
CPC .............. *F16C 27/04* (2013.01); *B23Q 1/40* (2013.01); *F16C 19/381* (2013.01); *F16C 33/58* (2013.01);
(Continued)

(58) Field of Classification Search
CPC ...... F16C 19/381; F16C 19/525; F16C 27/04; F16C 33/58; F16C 33/583; F16C 33/605;
(Continued)

(56) References Cited

U.S. PATENT DOCUMENTS 3,980,354 A * 9/1976 Lamprecht ............. F16C 33/60
384/455
4,989,999 A 2/1991 Siemensmeyer
(Continued)

FOREIGN PATENT DOCUMENTS

| CN | 202431744 | 9/2012 |
| CN | 202659722 | 1/2013 |

(Continued)

*Primary Examiner* — Phillip A Johnson
(74) *Attorney, Agent, or Firm* — Volpe and Koenig, P.C.

(57) ABSTRACT

The invention relates to a rotary-table bearing assembly, including: a rotary-table bearing, which has an inner ring, an outer ring, and rolling elements arranged in one or more rows, which roll on the inner ring and on the outer ring; and in each case an assembly component having a clamping segment, to which assembly components the outer ring and the inner ring are connected. According to the invention, the clamping segment of at least one assembly component is designed radially elastic on the assembly component, and/or the outer ring and/or the inner ring has a radially elastic connecting segment, by which the particular ring is connected to the assembly component.

9 Claims, 3 Drawing Sheets

(51) Int. Cl.
  *F16C 19/38* (2006.01)
  *F16C 33/58* (2006.01)
  *B23Q 1/40* (2006.01)

(52) U.S. Cl.
  CPC ...... *F16C 33/586* (2013.01); *B23Q 2220/004* (2013.01); *F16C 2300/14* (2013.01); *F16C 2322/39* (2013.01); *F16C 2322/50* (2013.01)

(58) Field of Classification Search
  CPC .. F16C 39/02; F16C 2300/14; F16C 2322/39; B23Q 1/40; B23Q 2220/004
  See application file for complete search history.

(56) References Cited

U.S. PATENT DOCUMENTS

| | | | | |
|---|---|---|---|---|
| 5,031,421 A | * | 7/1991 | Engelfried | ............ D04B 15/14 384/493 |
| 2009/0103845 A1 | | 4/2009 | Meier et al. | |

FOREIGN PATENT DOCUMENTS

| | | |
|---|---|---|
| CN | 103557230 | 2/2014 |
| DE | 1201128 | 9/1965 |
| DE | 1271469 | 6/1968 |
| DE | 3942847 | 6/1991 |
| DE | 102006019982 | 10/2007 |
| DE | 102008017457 | 10/2009 |
| DE | 102009037392 | 2/2011 |

* cited by examiner

ROTARY-TABLE BEARING ASSEMBLY

FIELD OF THE INVENTION

The invention relates to a rotary table bearing assembly comprising a rotary table bearing with an inner ring, an outer ring, and rolling elements that are arranged in one or more rows and roll on the inner ring and on the outer ring, and, in each case, an assembly component with a clamping section with which the outer ring and the inner ring are connected.

BACKGROUND

For increasing productivity, multiple processes are integrated to cutting processes of workpieces. One possibility is the combination of turning and milling operations in one machine. This machine typically comprises a rotary table that is supported so that it can rotate via a corresponding rotary table bearing assembly. While up until now rotary table bearing assemblies were designed only for swiveling tasks or slow continuous turning, with respect to the extension of the scope of work, it is required to design the bearing assembly so that high rotational speeds can also be realized for a longer time period. To do this, the rotary table bearing is typically constructed as a compact bearing and a torque motor is used as a drive. For higher rotational speeds, the rotary table bearing is constructed as a rolling bearing, wherein different constructions can be used, tailored to the loading of the bearing. The performance capacity of the bearing is determined by the effective pretensioning that equals a few micrometers depending on the bearing diameter in the rolling contact. According to the friction in the rolling contact, at high rotational speeds, friction losses occur in the form of heat that is discharged to the inner ring and the outer ring.

The torque motor that is used must provide a limited rotational speed that is usually achieved only by a field-weakening operation in order to still have sufficient torque for the milling process in the lower rotational speed range. At high rotational speeds of the rotor, the current control frequencies are also high, which in turn leads to high losses from magnetization changes. This in turn leads to an increased generation of heat and the rotor becomes hot due to the losses from magnetization changes in the rotor. Active cooling of the rotor is possible only with increased expense due to the risk of leakage. In known constructions, the rotor is connected to the shaft that is connected to the inner ring and is supported so that it can rotate by the inner ring and carries the table. This results in heat transfer from the rotor to the rotary table bearing. Due to the preferred use of grease lubrication in the rotary table bearing, heat dissipation via the lubricant is not guaranteed. Heat sources and heat sinks produce local temperature gradients that usually heat the stationary and moving parts of the rotary table differently. Due to the heat transfer from the rotor via the bearing inner ring to the table plate, a heat concentration in the radial part of the bearing is given. This has the result that the shaft and the inner ring expand more than the outer ring, wherein the pretensioning and the pressure in the rotary table bearing, especially the radial raceway, increase, which reduces the service life.

SUMMARY

The invention is thus based on the objective of providing a rotary table bearing assembly that enables the at least partial dissipation of the resulting increasing pre-tensioning despite locally different heating.

To achieve this object, for a rotary table assembly of the type specified above, it is provided according to the invention that the clamping section of at least one assembly component has a radial elastic construction on the assembly component and/or that the outer ring and/or the inner ring have a radial elastic connecting section by which each ring is connected to the assembly component.

According to the invention, the rotary table bearing assembly has a targeted elasticity that makes it possible that an inherent radial symmetric softness is given through which it is possible for the diameter growth to be provided elastically with a corresponding spring stiffness. That means that a radial symmetric elasticity compensates any diameter growth so that the bearing pretensioning is not increased or increased only to a reduced extent. An increased radial load is consequently at least partially compensated while the stiffness remains constant in the axial load direction or with respect to any tilting moments.

Due to the structurally or geometrically realized radial-symmetric elasticity, the bearing assembly can operate without significant increase in pretensioning despite thermal loading and geometrical changes due to thermal effects. A reduction of service life or premature failure is not noted despite the sometimes considerable thermal load.

According to a first construction of the invention, the elastic clamping section that carries the outer ring can be constructed as a circumferential elastic ring constructed over a circumferential annular groove on the assembly component. In this construction, the screw-in surface for the outer ring has a cylindrical annular shape that is constructed so that it can yield elastically and reversibly during the expansion of the assembly component and the pressure increase drops moderately in the rolling contact. This elastic ring geometry is constructed, e.g., by a notched, circumferential annular groove on the assembly component. The thickness of this annular elastic clamping section determines its elastic properties; it is selected so that the theoretically determinable increase in diameter due to thermal effects, coming from the inner ring, can be compensated in this way. If the required ring thickness is very thin, because the desired elasticity to be achieved in the elastic clamping section must be high, it is possible to construct the cross section of the ring section for increasing the elasticity, for example, with an S-shaped form, also with segmenting of the ring. Segmenting and S-shaped cross-sectional designs can also be provided together.

The construction of the elastic clamping section as an annular shape by means of the circumferential annular groove leads to radial elasticity. In the translational direction, the rotary table bearing typically screwed by means of the outer ring to the clamping section has sufficient stiffness due to the annular shape of the screw-on surface. This means that the radial-symmetric stiffness is low, but the stiffness is still high in the tangential and axial directions and corresponds to the requirements.

As an alternative to the construction of the clamping section as an elastic cylindrical ring, it is also conceivable to construct the outer ring as such with inherent elasticity. According to this construction of the invention, the outer ring can have an essentially L-shaped cross section, wherein the rolling elements run on the leg projecting radially inward toward the inner ring and the vertical leg forms the connecting section. By means of this vertical leg, the outer ring is fixed, typically screwed, to the clamping section. This, compared with the length of the horizontal leg, is a significantly longer fastening leg that is dimensioned sufficiently narrow to provide the desired elasticity.

The fixing or screwing of the outer ring can be realized either somewhat from above through the entire elastic leg into the clamping section or alternatively it is also possible that the clamping section has through holes accessible from the bottom side for holding screws that fix the connecting section on the clamping section and are screwed into threaded holes on the end side of the elastic leg.

If the leg thickness is also too low in this construction for achieving the target elasticity, it is also possible to segment this leg so that it can have a wide construction even though the radial-symmetric elasticity is in the desired range due to the segmenting.

Independent of which of the two specified constructions is selected, in the case of the segmenting it is possible to lead the slots viewed vertically up to the plane of the base of the annular groove or up to the inward projecting leg of the outer ring, so that consequently, viewed vertically, relatively long slotted segments are produced. The actual slot arrangement or the division and slot depth, consequently the number of segments and segment height, must be designed with reference to the given requirements, in order to realize the necessary desired target elasticity.

The two embodiments mentioned first are distinguished in that the elasticity in the region of the outer ring connection to the add-on part is provided. As an alternative, there is the possibility to realize the elasticity also in the area of the clamping section carrying the inner ring. To do this, according to one alternative of the invention it is provided that the elastic clamping section that carries the inner ring is a hollow-cylindrical section passing through the inner ring in a shaft supported by the rotary table bearing against which the inner ring is radially clamped. The inner ring is passed through, viewed radially, by the shaft that is to be supported by it; it is pressed fixed onto the shaft that has the corresponding clamping section. The fixing in the vertical direction is realized by means of corresponding screws that pass through the inner ring vertically and are screwed in a corresponding radial table flange of the shaft on which the table plate is arranged. According to the invention, the hollow-cylindrical shaft section on which the inner ring is clamped now has an elastic construction through a corresponding geometric construction relative to the table flange, that is, a slight radial-symmetric elasticity is provided in this area. If the geometry in the bearing area changes because of thermal effects, for example, due to the support on the outer ring that is not supported itself elastically, this leads to elastic yielding in the area of the hollow-cylindrical shaft section. This means that for this construction of the invention, a pretensioning increase set otherwise by thermal effects is dissipated by the radially inner elasticity. It would even also be conceivable to form corresponding section segments in this area by the construction of slots that extend also only partially over the section length.

For the optionally necessary stiffening of the hollow-cylindrical section, a radially inward extending annular collar can be provided preferably also on the end of the hollow-cylindrical section on which, in this case, the rotor can also be preferably mounted.

Overall, the rotary table bearing assembly offers a defined radial-symmetric softness or elasticity that can dissipate tension increases caused by thermal effects in the rolling contact. The bearing can even be nominally pretensioned stronger without significantly increasing the pressure, wherein for stronger heating of the inner ring or the outer ring, the freedom of play in the radial raceway system remains constant over a larger temperature range.

BRIEF DESCRIPTION OF THE DRAWINGS

The rotary table bearing assembly formed according to the invention will be explained below in more detail in multiple preferred embodiments with reference to the accompanying drawings. Shown herein are.

DETAILED DESCRIPTION OF THE PREFERRED EMBODIMENTS

Figure 1:
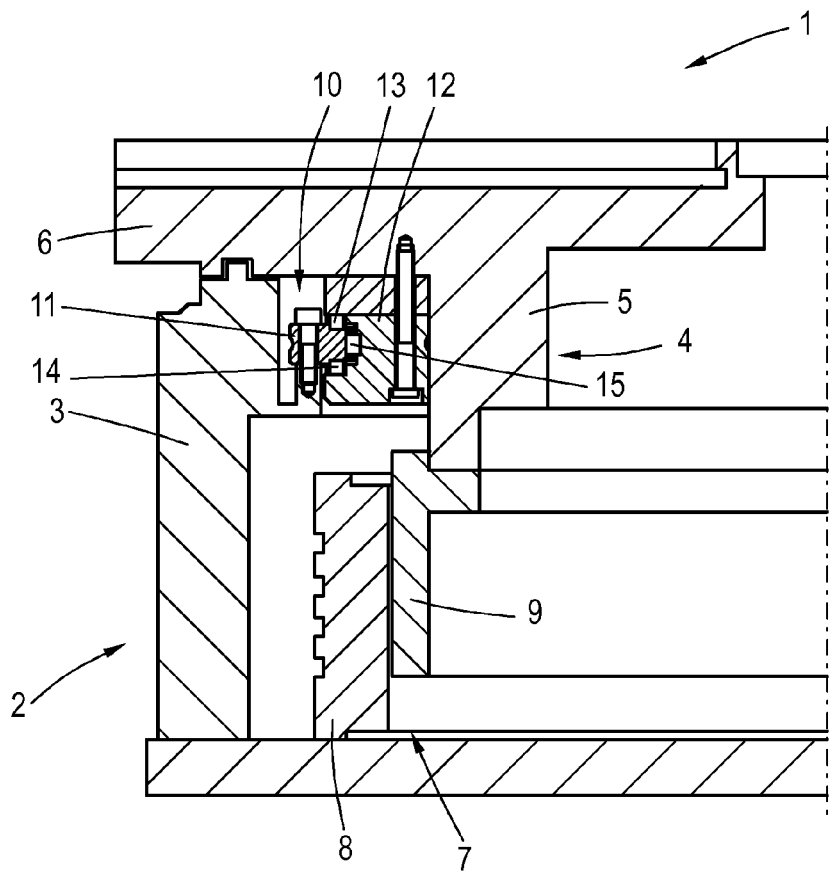
FIG. 1 a basic diagram of a part of a rotary table machine with a rotary table bearing assembly according to the invention, FIG. 2 an enlarged detail view of the rotary table bearing assembly from FIG. 1, FIG. 3 a plan view of the elastic clamping section constructed as a cylindrical ring for the outer ring, FIG. 4 an alternative construction of the clamping section with S-shaped cross-sectional profile, and FIG. 5 another embodiment of a rotary table bearing assembly according to the invention with L-shaped outer ring and optional elastic clamping section on the inner ring load-bearing assembly component in the form of a shaft.

FIG. 1 shows a cross-sectional cut through a rotary table machine 1 according to the invention comprising a table frame 2 with a frame component 3 that shows an assembly component with a clamping section for an outer ring of a rotary table bearing that will be described below.

Also provided is a shaft 4 that has another assembly component with a clamping section for the inner ring of the rotary table bearing, wherein this clamping section is realized by the hollow-cylindrical section 5 of the shaft 4. The shaft 4 has a table flange 6 on which, not described in more detail, the actual rotary table to be turned is mounted.

For driving the shaft 4 there is a torque motor 7 comprising a stator 8 that is fixed on the frame side and a rotor 9 that is separated by an air gap and is arranged in extension of the hollow-cylindrical section 5 of the shaft 4. The stator 8 and rotor 9 are separated in a known way by an air gap, so that a free rotational movement of the rotor 9 relative to the stator 8 is given. The structure and functioning of such a torque motor is sufficiently known.

Due to the operational changes in magnetizations in the area of the rotor, considerable warming occurs there. The flow of heat travels from the rotor 9 via the section 5 into the area of the rotary table bearing that is then heated, especially in the area of the inner ring, so that radial expansion happens there, which leads to an increase in the pretensioning in the rolling contact. This increase is compensated by the integration of a defined elasticity according to the invention, with the following also being noted.

As described, the rotary table bearing assembly further comprises the actual rotary table bearing 10, with an outer ring 11 and an inner ring 12. The inner ring 12 is guided on the outer ring 11 by a total of three rolling element rows 13, 14, 15, wherein the rolling element rows 13 and 14 are used for axial support and the rolling element row 15 is used for radial support. In principle, the same physical effects also function in other bearing structures, e.g., two-row angular contact roller bearings.

Figure 2:
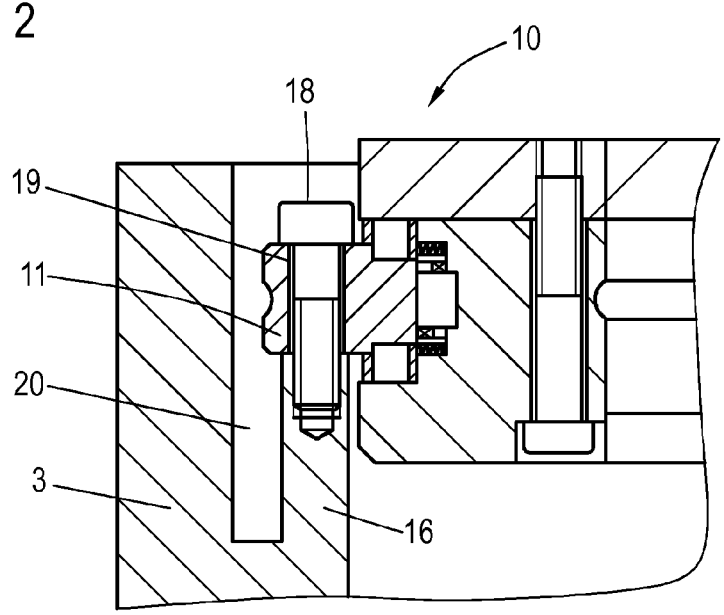

FIG. 2 shows, in an enlarged partial view, the area of the rotary table bearing 10. On the assembly component 3, that is, the relevant part of the table frame, there is a clamping section 16 that has a plurality of threaded holes 17, see, for an example, the view from FIG. 3, in which corresponding fastening screws 18 that engage the outer ring in the corresponding through holes 19 are screwed. The clamping section 16 is constructed as a cylindrical ring that is defined by a circumferential annular groove 20. Resulting from this notch realized by the annular groove 20, the clamping section 16 is radially elastic; thus it has a corresponding spring stiffness that makes it possible to react flexibly to any increase in diameter of the inner ring 12 caused by thermal effects. Due to this radial-symmetric softness or elastic flexibility, an increase of the pretensioning in the rolling contact, especially in the area of the radial rolling element row 15, is at least partially compensated, so that it does not lead to an impermissible increase in tension there that would result in excessive bearing load.

Figure 3:
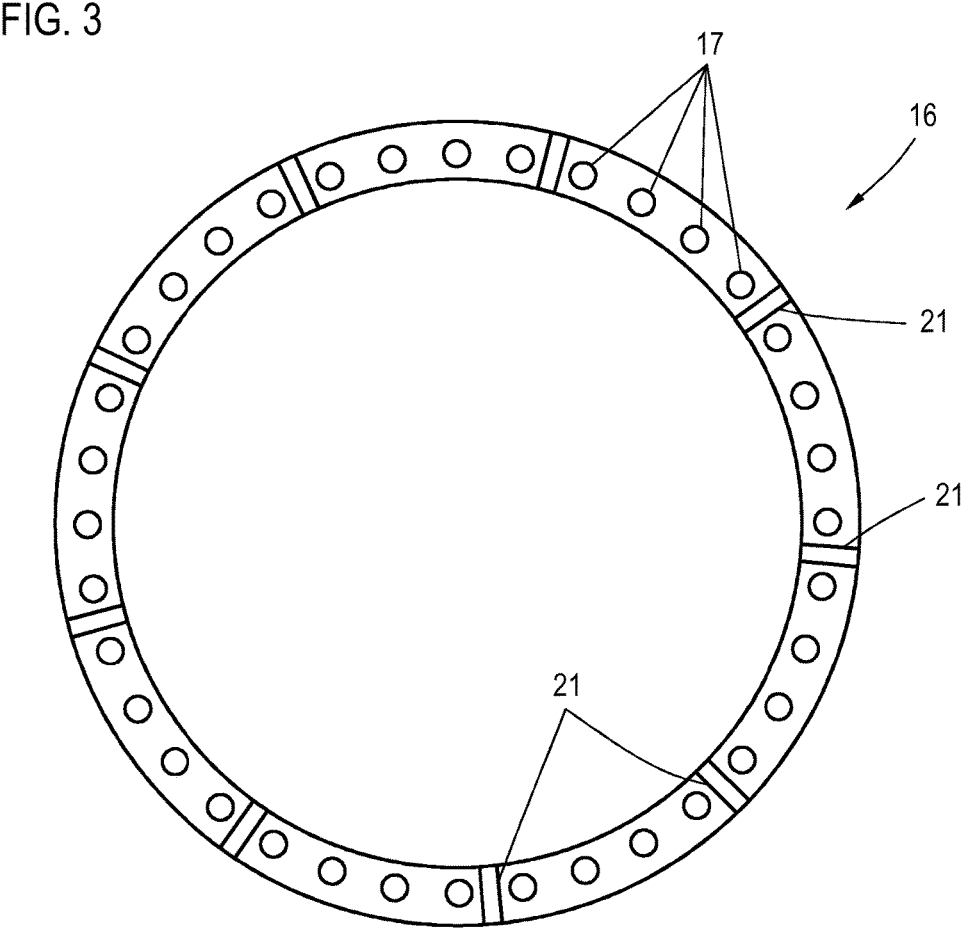

The narrower the annular clamping section 16, the more elastic it is. But its thickness must not be too small. If the target flexibility, that is, the desired elasticity, would lead to too little thickness in the clamping section 16, there is also the possibility of segmenting the clamping section 16 by multiple slots 21, as shown in FIG. 3. The slots extend preferably over the entire height of the clamping section 16, that is, up to the base of the annular groove 20. In this way, the tensile stress in the circumferential direction is reduced when the clamping section 16 expands and the respective elasticity increases, so that the clamping section 16 can have sufficient thickness.

Due to the target elasticity of the clamping section 16 according to the invention, compensation of any radial diameter extensions in the area of the shaft 4 or the inner ring 15 can be compensated, so that it does not cause any significant increase in the bearing pretensioning, especially in the radial direction. In addition, due to the radial-symmetric elasticity, the rotary table bearing 10 can also be pretensioned nominally somewhat more in this area without significantly increasing the pressure. In this way it is guaranteed that for stronger heating of the outer ring that likewise experiences a certain widening, the freedom of play in the radial raceway system also remains constant over a larger temperature range.

Figure 4:
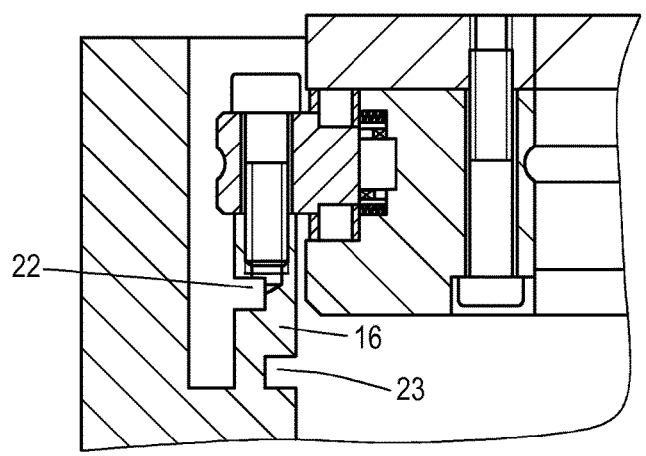

While FIG. 2 shows a non-profiled clamping section 16 viewed in cross section, FIG. 4 shows an assembly that is comparable with the construction according to FIG. 3 but only the clamping section 16 has an S-shaped profile by two radial notches 22, 23. As long as its basic width allows, an increase in the elasticity can be achieved by means of this profiling. In this case, segmenting can be eliminated, although this could also still be provided.

Figure 5:
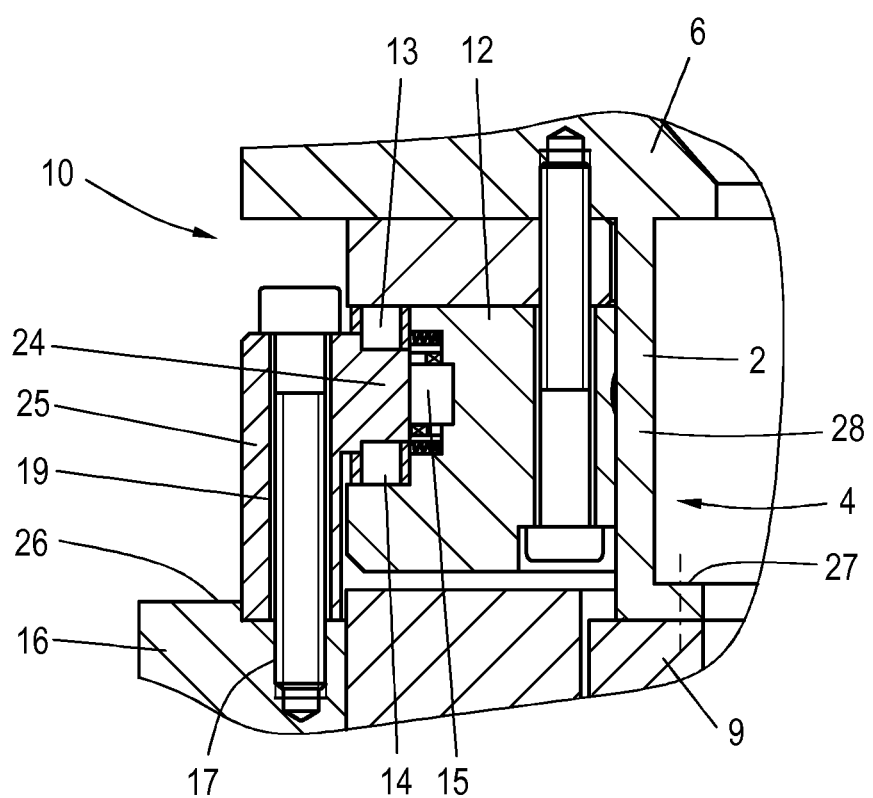

FIG. 5 shows another embodiment according to the invention of a rotary table bearing assembly in which, in turn, a corresponding rotary table bearing 10 is provided, comprising an outer ring 11, an inner ring 12, and the corresponding rolling element rows 13, 14, 15. The outer ring 11 is in turn screwed on a corresponding clamping section 16 of the assembly component 3, that is, of the table frame, by corresponding fastening screws 18. Here, however, the defined elasticity on the outer ring 11 is constructed inherently. The outer ring 11 is here constructed essentially with an L-shaped cross section. It has a horizontal leg 24 on which the raceways for the rolling element rows 13, 14, 15 are formed. Furthermore, it has a vertical leg 25 that is significantly longer than the horizontal leg 24, so that the outer ring 11, compared with the construction according to FIGS. 2 and 4, is significantly longer viewed vertically. The vertical leg 25 is here passed through completely with a corresponding through opening 19 that is penetrated by the screw 18 screwed into a corresponding threaded hole 17 on the clamping section 16. The outer ring 11 is supported on a collar 26 of the clamping section 16.

The cylindrical leg 25 is ultimately elastic due to its mounting on the clamping section side; that is, the corresponding flexibility is realized by this mounting, which compensates the diameter expansion in the area of the inner ring 12 caused by any thermal effects. The radial-symmetric elasticity is thus also realized in the embodiment described above. While the elasticity is realized by means of the annular clamping section 16 in the previously described embodiment, in the construction according to FIG. 5 the elasticity is realized by means of the annular construction of the leg 25 of the outer ring 11. The leg 25 can also have corresponding slots for increasing its elasticity, so that it is segmented at least in sections. The function of both constructions is ultimately the same.

Optionally or additionally, in FIG. 5, a construction possibility for a radially inner elasticity is also shown. While, see FIG. 1, for a realization of the elasticity in the area of the outer ring, the hollow-cylindrical section 5 of the shaft 4 has a very thick design, in the construction according to FIG. 4, the hollow-cylindrical section 5 of the shaft 4 has a very narrow design, so that the shaft 4 has a quasi "radially soft" design. The hollow-cylindrical section 5 of the shaft 4 forms the clamping section 28 on which the inner ring 12 is pressed. Due to the integral connection on the table flange 6, a certain elasticity of the narrow hollow-cylindrical section 5 relative to the table flange 6 is given. An optionally required stiffening can be achieved by means of a radially inward annular collar 27 on which the rotor 9 can also be mounted.

In the construction according to FIG. 5, a double elasticity is provided both outward and also inward.

If the inner elasticity is provided only by means of the narrow hollow-cylindrical section 5 of the shaft 4 and the outer ring 11 is mounted non-elastically on the solid assembly component 3, that is, the table frame, then any widening in the area of the shaft 4 or the inner ring 5 caused by thermal effects would be compensated by the elasticity of the slightly yielding hollow-cylindrical section 5. The section 5 can be provided if necessary with vertical slots in order to be designed with sufficient elasticity, for example, for given stiffening by the annular collar 27 over its height. At this point it should be noted that the two constructions shown in FIG. 5, namely, on one hand, the integrated elasticity in the area of the outer ring 11 and, on the other hand, the integrated elasticity in the area of the hollow-cylindrical section 5, can both be provided separately, that is, only one of the two elasticities could be integrated, or both could also be provided together. Obviously, there is also the possibility of combining the inner elasticity by means of the narrow hollow-cylindrical section 5 in connection with the integrated elasticities according to the embodiments according to FIGS. 2 and 4.

LIST OF REFERENCE NUMBERS

1 Rotary table machine
2 Table frame
3 Frame component
4 Shaft
5 Section
6 Table flange
7 Torque motor
8 Stator
9 Rotor
10 Rotary table bearing 11 Outer ring
12 Inner ring
13 Rolling element row
14 Rolling element row
15 Rolling element row
16 Clamping section
17 Threaded hole
18 Fastening screw
19 Through hole
20 Annular groove
21 Slot
22 Notch
23 Notch
24 Leg
25 Leg
26 Collar
27 Ring collar
28 Clamping section

The invention claimed is:

1. A rotary table bearing assembly comprising a rotary table bearing with an inner ring, an outer ring, and rolling elements that are arranged in one or more rows and roll on the inner ring and on the outer ring, and a respective assembly component with a clamping section connected to each of the outer ring and the inner ring, the clamping section of at least one of the respective assembly components has a radial elastic construction on the at least one of the respective assembly components or at least one of the outer ring or the inner ring has a radial elastic connecting section by which each of the outer and inner rings is connected to the assembly component, or at least one of the respective assembly components has the radial elastic construction and the least one of the outer and inner rings has the radial elastic connecting section.

2. The rotary table bearing assembly according to claim 1, wherein the clamping section that carries the outer ring is constructed as a circumferential ring constructed elastically via a circumferential annular groove on the assembly component.

3. The rotary table bearing assembly according to claim 2, wherein the ring has an S-shaped cross section.

4. The rotary table bearing assembly according to claim 1, wherein the outer ring has an essentially L-shaped cross section, wherein the rolling elements run on a leg projecting radially inward to the inner ring and a vertical leg forms the connecting section.

5. The rotary table bearing assembly according to claim 4, wherein the clamping section has through openings accessible from a bottom side for holding screws that fix the connecting section on the clamping section and are screwed into threaded holes on an end face of the elastic leg.

6. The rotary table bearing assembly according to claim 4, wherein the ring forming the clamping section or the leg of the outer ring forming the connecting section is segmented by radial slots.

7. The rotary table bearing assembly according to claim 6, wherein the slots extend, viewed vertically, up to a plane of a base of an annular groove on the assembly component or up to an inwardly projecting leg of the outer ring.

8. The rotary table bearing assembly according to claim 1, wherein the elastic clamping section that carries the inner ring is followed by a hollow-cylindrical section passing through the inner ring in a shaft that is supported by the rotary table bearing and against which the inner ring is tensioned radially.

9. The rotary table bearing assembly according to claim 8, wherein a ring collar extending radially inward is provided on a lower end of the hollow-cylindrical section.

* * * * *